United States Patent [19]
He

[11] Patent Number: 5,727,397
[45] Date of Patent: Mar. 17, 1998

[54] TRIPLE EFFECT ABSORPTION REFRIGERATION SYSTEM

[75] Inventor: Xiaoyu He, York, Pa.

[73] Assignee: York International Corporation, York, Pa.

[21] Appl. No.: 743,373

[22] Filed: Nov. 4, 1996

[51] Int. Cl.[6] ................................................ F25B 15/00
[52] U.S. Cl. ........................................ 62/476; 62/489
[58] Field of Search ............................ 62/101, 476, 148, 62/141, 335, 483, 485, 489

[56] References Cited

U.S. PATENT DOCUMENTS

| | | | |
|---|---|---|---|
| 3,266,266 | 8/1966 | Reid, Jr. | 62/476 |
| 3,316,728 | 5/1967 | Biermann | 62/476 |
| 3,452,550 | 7/1969 | Dyre et al. | 62/476 |
| 3,541,013 | 11/1970 | Macriss et al. | 62/112 |
| 3,593,540 | 7/1971 | Hopkins | 62/476 |
| 3,742,728 | 7/1973 | Mamiya | 62/476 |
| 3,783,631 | 1/1974 | Modahl et al. | 62/112 |
| 3,928,983 | 12/1975 | Ainbinder et al. | 62/101 |
| 3,949,566 | 4/1976 | Hopkins | 62/475 |
| 3,977,204 | 8/1976 | Bourne | 62/85 |
| 4,315,411 | 2/1982 | Vardi et al. | 62/112 |
| 4,333,515 | 6/1982 | Wilkinson et al. | 165/1 |
| 4,439,999 | 4/1984 | Mori et al. | 62/238.3 |
| 4,520,634 | 6/1985 | Oouchi et al. | 62/476 |
| 4,531,374 | 7/1985 | Alefeld | 62/79 |
| 4,542,628 | 9/1985 | Sarkisian et al. | 62/335 |
| 4,542,629 | 9/1985 | Biermann | 62/476 |
| 4,551,991 | 11/1985 | Miyoshi et al. | 62/476 |
| 4,637,218 | 1/1987 | Tchernev | 62/106 |
| 4,732,008 | 3/1988 | DeVault et al. | 62/79 |
| 4,827,728 | 5/1989 | DeVault et al. | 62/79 |
| 4,921,515 | 5/1990 | Dao | 62/335 |
| 5,033,274 | 7/1991 | Erickson | 62/476 |
| 5,205,136 | 4/1993 | DeVault et al. | 62/476 |
| 5,284,029 | 2/1994 | Keuper et al. | 62/476 |
| 5,335,515 | 8/1994 | Rockenfeller et al. | 62/476 |
| 5,390,509 | 2/1995 | Rockenfeller et al. | 62/476 |
| 5,467,614 | 11/1995 | DeVault | 62/476 |
| 5,584,193 | 12/1996 | Biermann | 62/476 |

FOREIGN PATENT DOCUMENTS

| | | |
|---|---|---|
| 278076 | 9/1914 | Germany. |
| 1208467 | 10/1970 | United Kingdom. |
| WO 90/12848 | 11/1990 | WIPO. |

*Primary Examiner*—William Doerrler
*Attorney, Agent, or Firm*—Finnegan, Henderson, Farabow, Garrett & Dunner, L.L.P.

[57] ABSTRACT

In a triple effect absorption refrigeration system, solution flows from an absorber to first and second generators connected in parallel. Solution exiting the first generator returns to the absorber. Solution exiting the second generator flows to a third generator connected in series with the second generator. Refrigerant vapor from each generator is condensed in a respective condenser. The third condenser exchanges heat with the second generator, and the second condenser exchanges heat with the first generator.

17 Claims, 5 Drawing Sheets

TRIPLE EFFECT ABSORPTION REFRIGERATION SYSTEM

BACKGROUND OF THE INVENTION

1. Field of the Invention

The present invention relates to a multiple effect absorption refrigeration system. More particularly, the present invention relates to a triple effect absorption refrigeration system having an inverse parallel series solution feeding arrangement.

2. Description of the Related Art

Absorption refrigeration systems are typical used to cool commercial buildings. For example, a single effect absorption system typically comprises a generator, a condenser, an evaporator and an absorber. In this system, a refrigerant-containing absorption solution is heated in the generator by an outside heat source, such as a fuel burner, low-pressure steam, or hot water, in order to boil off refrigerant vapor. The refrigerant vapor is condensed to refrigerant liquid, and then routed to an evaporator. The refrigerant liquid in the evaporator absorbs the heat from the air in the commercial building being cooled, again flashing to vapor. The refrigerant vapor flows to an absorber, where it mixes with an absorption liquid, and the combined refrigerant-containing absorption solution is pumped to the generator.

The single effect absorption system described above is extremely inefficient, having a thermal Coefficient of Performance (COP) of approximately 0.7.

A more modern approach is to use a double effect absorption refrigeration system. In this latter system, the single generator and condenser are replaced by two generators (high temperature generator and low temperature generator) and two condensers (also high temperature and low temperature). Primary heat is supplied to the high temperature generator to boil off refrigerant vapor from the refrigerant-containing absorption solution. The refrigerant vapor is condensed in the high temperature condenser. The heat of condensation from the high temperature condenser is used to heat the refrigerant-containing absorption solution in the low temperature generator, boiling off more vapor in that generator. In this manner, the heat input to the system is utilized twice to generate refrigerant vapor. The thermal COP of a double-effect absorption system hence is improved to approximately 1.2.

In recent years, experiments have been conducted with a triple effect absorption system, utilizing three generators and three condensers. Various configurations of related triple effect absorption systems will be discussed below.

FIG. 3 depicts one triple effect absorption system, in which an absorber A provides refrigerant-containing absorption solution to three generators, including a high temperature generator G3, an intermediate temperature generator G2, and a low temperature generators G1, all connected in parallel. Each generator feeds refrigerant vapor to a corresponding condenser, including a high temperature condenser C3, an intermediate temperature condenser C2, and a low temperature condenser C1. Furthermore, the higher temperature condensers C3 and C2 are coupled with the lower temperature generators G2 and G1, respectively. Hence, the system is referred to as a double-coupled condenser (DCC) triple effect absorption system. Heat exchangers HX1, HX2, and HX3 can be provided in the parallel flowpath from the absorber. The thermal COP for such a system is approximately 1.6 to 1.8.

FIG. 4 depicts another DCC triple effect absorption system. In this configuration, generators G1, G2 and G3 are connected in inverse series with absorber A, rather than in parallel as in FIG. 3. Heat exchangers HX1, HX2 and HX3 are provided in the inverse series flowpath.

FIG. 5 depicts yet another DCC triple effect absorption system, with the generators G3, G2 and G1 connected to the absorber A in a series flow arrangement. Heat exchangers HX1, HX2 and HX3 are provided in the series flowpath.

Another related DCC triple effect absorption system includes two evaporators and two absorbers. One absorber A1 feeds generator G1, while the other absorber A2 feeds generators G2 and G3 in parallel. Various other possible connections have been proposed in the multiple absorber configuration, with one absorber feeding one generator, and the other absorber feeding two generators either in series or in parallel.

The related triple effect absorption systems described above have a number of shortcomings.

The thermal COP of the series or inverse series arrangement is relatively low. In a series or inverse series arrangement, nearly all of the absorption solution has to pass all three heat exchangers HX1, HX2, HX3. Thus, the heat exchanger load is very heavy. Since heat exchanger efficiency is less than 100%, a heavier load leads to a higher heat loss.

An inverse series arrangement also requires three absorption fluid pumps to pump the absorption fluid to all three generators. This increases the cost of the system.

A parallel system, such as the one depicted in FIG. 3, will have an optimum flow condition. Obtaining optimum flow to three generators in parallel, however, is extremely difficult, thereby reducing system COP.

In the parallel system, the hot absorption fluid exiting from the intermediate temperature generator G2 mixes with the hot absorption fluid exiting from the high temperature generator G3. The different temperature and composition of these fluids results in a mixing loss. Moreover, the temperature difference on both sides of HX3 is very large, creating additional thermal losses.

Moreover, triple effect absorption systems require a heat mass transfer additive. The heat mass transfer additive is a kind of alcohol (typically 2ethel-1-hexanol) provided in the solution to help the absorber work properly. The alcohol-containing solution flows directly from the absorber to the high temperature generator G3. There is a risk that the alcohol will break down under the high temperature in G3, thereby disabling the entire system.

Multiple evaporator/multiple absorber systems are extremely expensive due to the extra evaporator and absorber components, and still retain many of the same thermal inefficiencies described above with respect to the single absorber systems.

SUMMARY OF THE INVENTION

The present invention has been made in view of the above circumstances and is intended to provide a triple effect absorption refrigeration system lacking the shortcomings associated with the related systems.

Additional objectives and advantages of the invention will be set forth in part in the description which follows, and in part will be obvious from the description, or may be learned by practice of the invention. The objectives and advantages of the invention may be realized and attained by means of the combinations particularly pointed out in the appended claims.

To achieve the objectives, and in accordance with the purposes of the invention, as broadly described herein, a triple effect absorption refrigeration system is provided. The system includes an evaporator. An absorber is operatively coupled to the evaporator. First, second, and third generators are provided, the first and second generator connected in parallel with the absorber to receive a solution in a first flowpath from the absorber, and the third generator connected in series with the second generator to receive the solution in a second flowpath from the second generator. A heat source is provided for heating the solution in the third generator to a first temperature, thereby separating the solution in the third generator into an absorption liquid and a refrigerant vapor. A third flowpath is provided for returning the absorption liquid from the third generator to the absorber. First, second, and third condensers are provided, operatively connected to receive and condense refrigerant vapor from the first, second and third generators, respectively. The third condenser is operatively connected to exchange heat with the second generator, and the second condenser is operatively connected to exchange heat with the first generator.

The triple effect absorption system of the present invention still uses two coupled generator/condensers, but in a different solution pair feeding arrangement. This arrangement is called an Inverse Parallel Series solution feeding arrangement. A weak solution, which means a solution containing a low ratio of absorption fluid to refrigerant, is fed from the absorber into the low temperature generator G1 and the intermediate temperature generator G2 in parallel. The solution in G2 is heated, and refrigerant vapor is boiled off. The now more concentrated solution, containing a higher ratio of absorption fluid to refrigerant, is sent from G2 to high temperature generator G3. The solution is further concentrated as more refrigerant is boiled off, and then exits G3. Likewise, the weak solution in G1 is concentrated as refrigerant is boiled off, and the more concentrated solution exits G1. This solution exiting G1 mixes with the more concentrated absorption liquid exiting G3, and returns to the absorber.

The system primary energy is input to G3, where it heats the solution and generates refrigerant vapor as described above. The refrigerant vapor generated from G3 is condensed in high temperature condenser C3, and the heat of condensation is exchanged with G2 in order to generate refrigerant vapor in G2, as described above. The condensate from C3 and the vapor from G2 pass intermediate temperature condenser C2. The heat of condensation in C2 is exchanged with G1 in order to generate refrigerant vapor from G1 as described above. The condensate from C2 and the vapor from G1 collect in low temperature condenser C1, and the resulting condensate is sent to evaporator E in order to obtain the desired refrigeration effect. The resultant low pressure vapor is then passed from the evaporator to the absorber, where it combines with the returning concentrated solution to dilute the solution and begin a new cycle.

BRIEF DESCRIPTION OF THE DRAWINGS

The accompanying drawings, which are incorporated in and constitute a part of the specification, illustrate a preferred embodiment of the invention. Together with the description, the drawings help to explain the objectives, advantages, and principles of the invention. In the drawings.

DETAILED DESCRIPTION OF THE PREFERRED EMBODIMENT

Reference will now be made in detail to the present preferred embodiment of the invention as broadly illustrated in the accompanying drawings.

Figure 1:
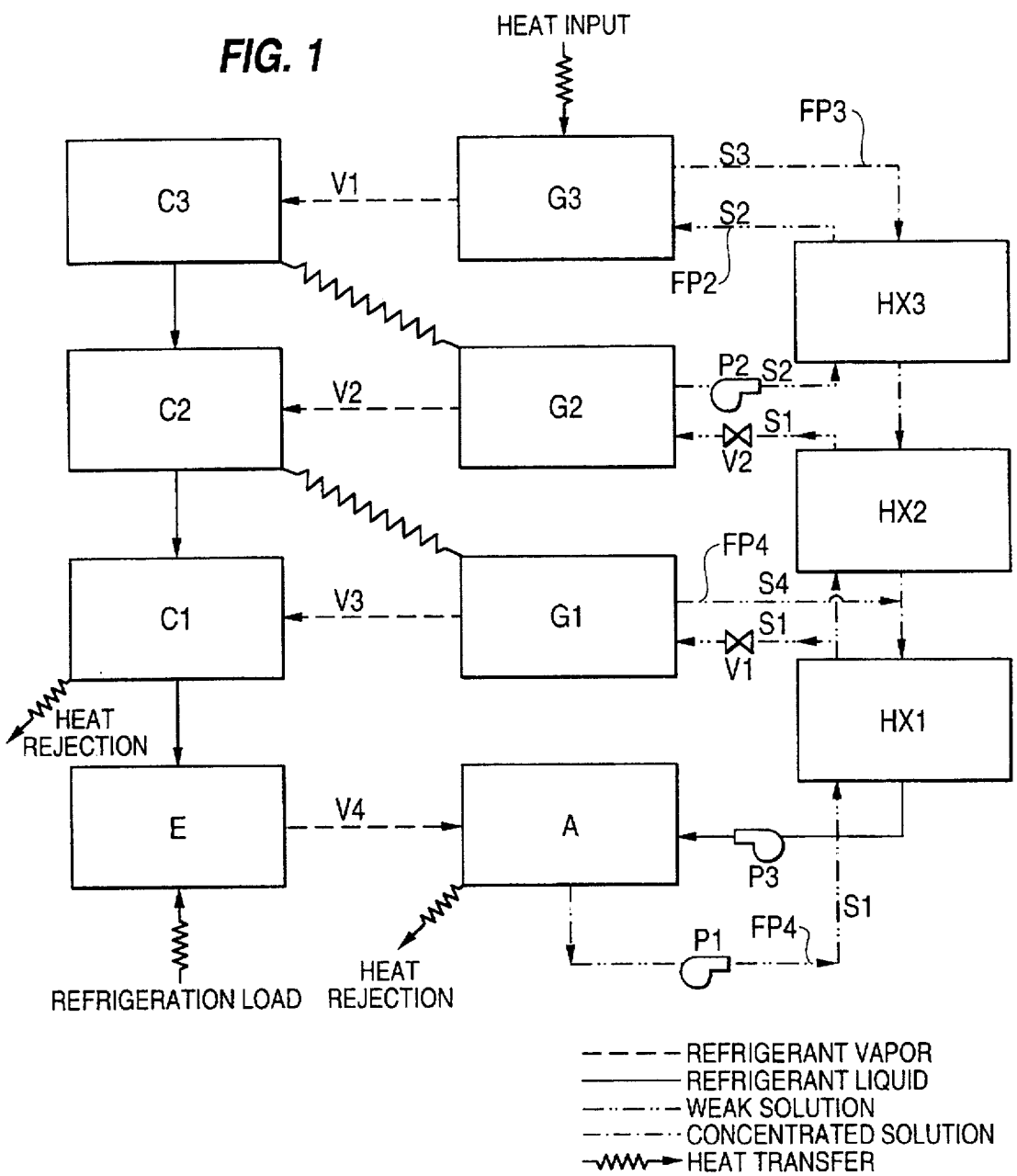
FIG. 1 is a schematic illustrating an inverse parallel series triple effect absorption refrigeration system in accordance with the present invention.
Figure 2:
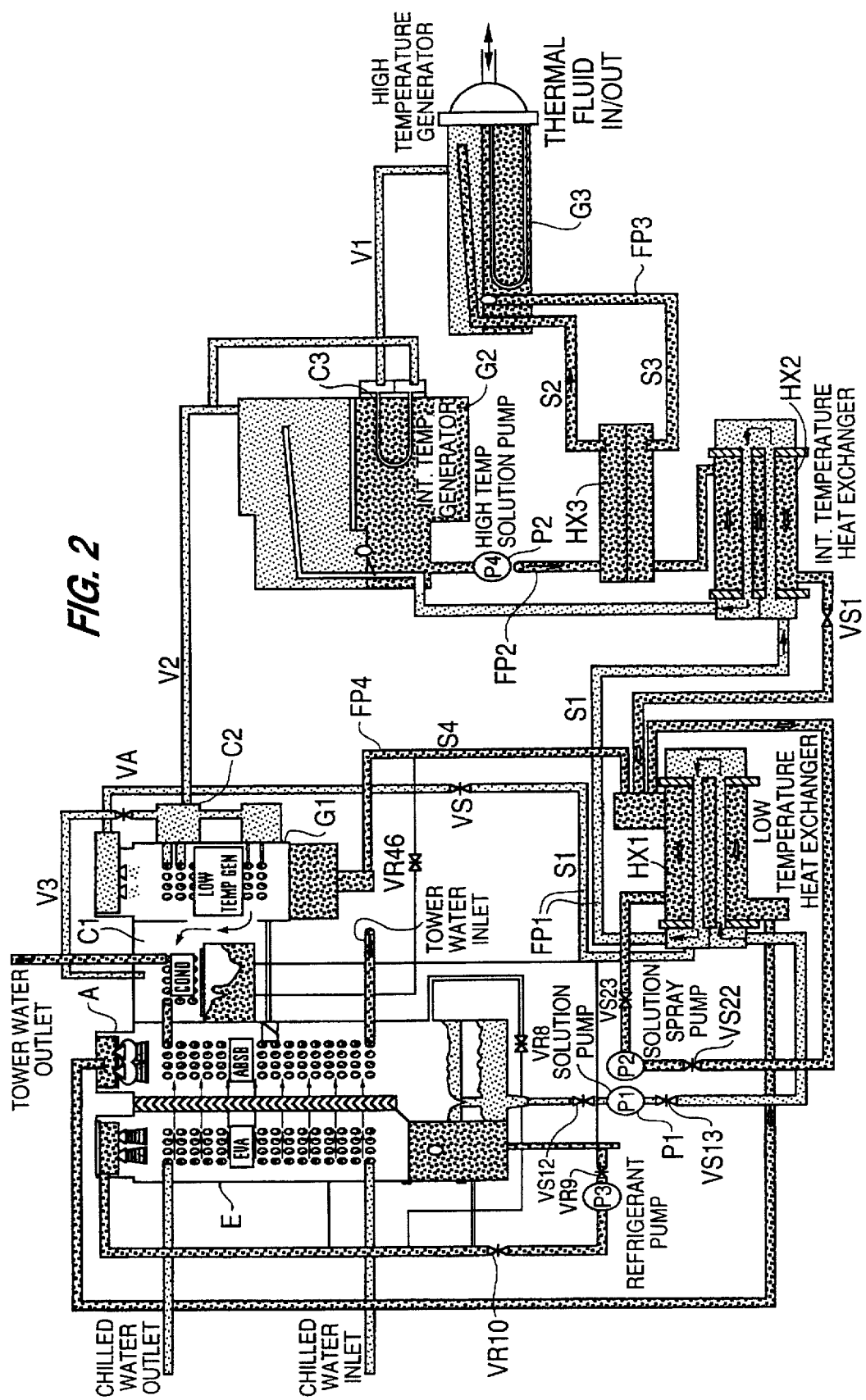
FIG. 2 is a flow diagram depicting solution and refrigerant flow in the embodiment of FIG. 1.
Figure 3:
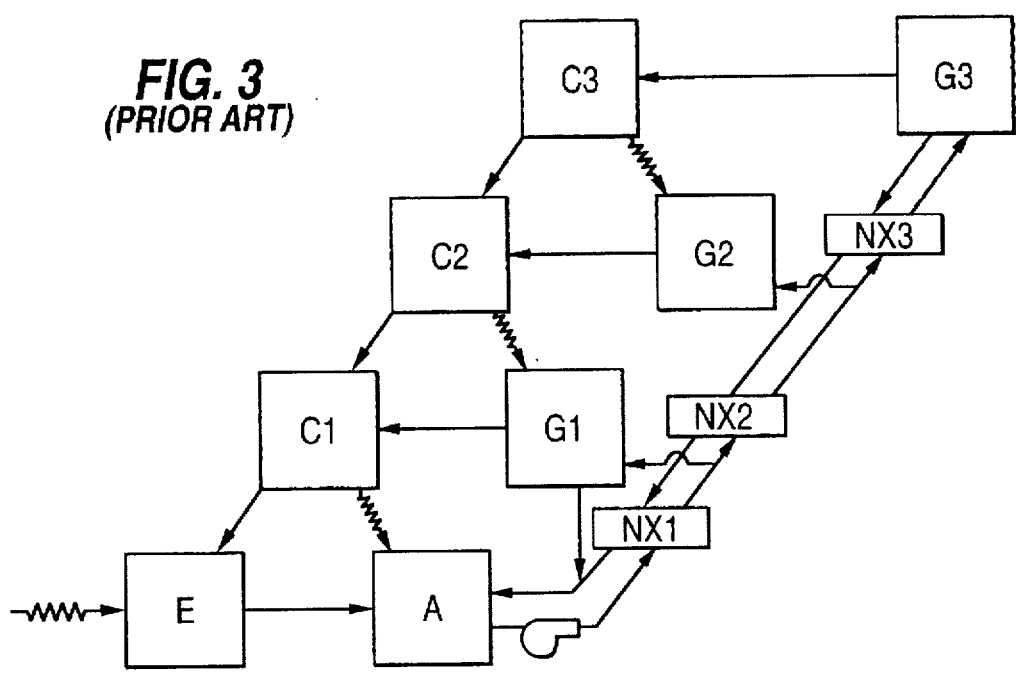
FIG. 3 depicts a parallel triple effect absorption refrigeration system.
Figure 4:
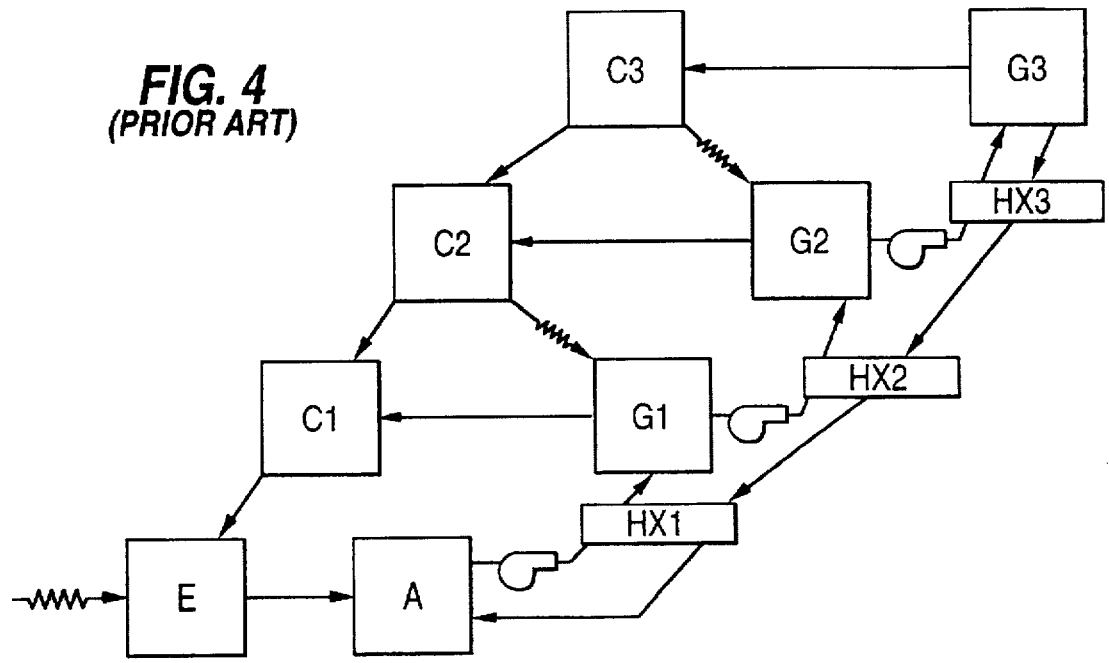
FIG. 4 depicts an inverse series triple effect absorption refrigeration system.
Figure 5:
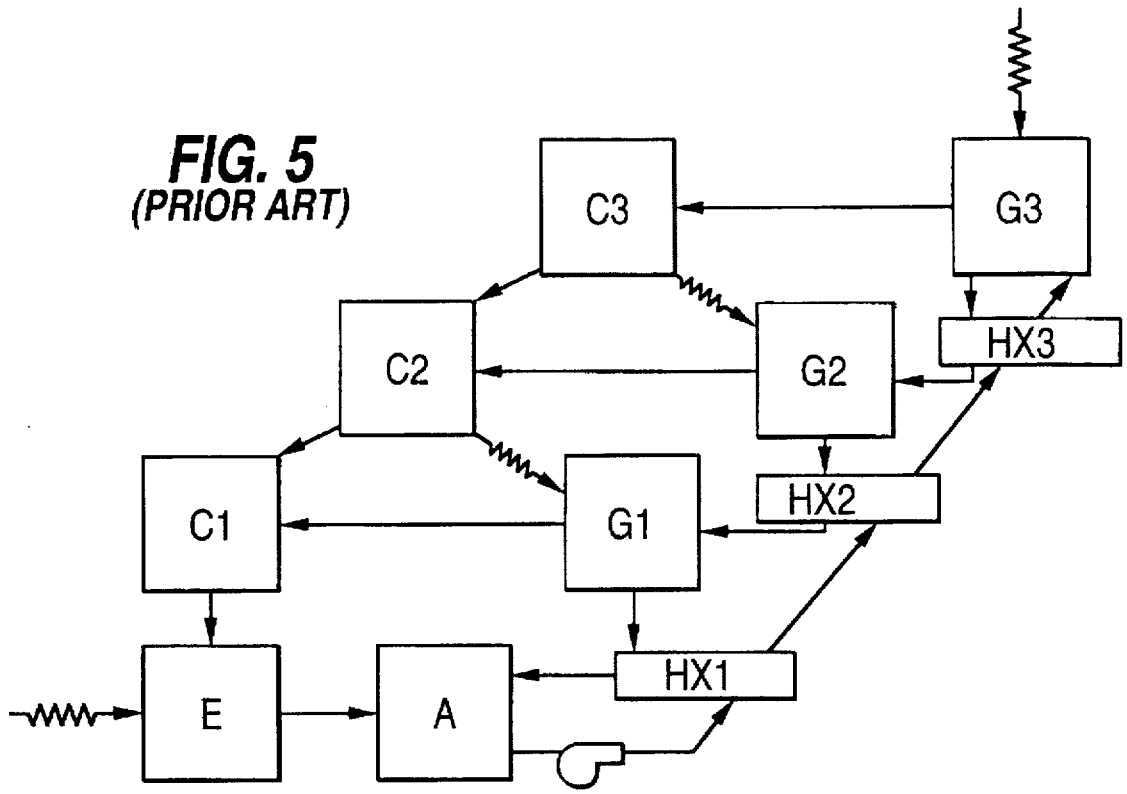
FIG. 5 depicts a series triple effect absorption refrigeration system.

An exemplary embodiment the present invention is a triple effect absorption refrigeration system, as generally illustrated in FIGS. 1 and 2.

In accordance with the invention, the triple-effect absorption refrigeration system comprises an evaporator. As generally embodied in FIG. 1, an evaporator E is provided. The evaporator E is the component which receives the refrigeration load, and thereby cools the building or enclosure being refrigerated. Evaporator E may be any of the evaporators that are well known in the art.

In accordance with the invention, an absorber is operatively coupled to the evaporator. As generally embodied in FIG. 1, an absorber A is connected to evaporator E via a conduit to receive a low pressure refrigerant vapor V4 from evaporator E. Absorber A is a single absorber. The structure of absorber A also is well known in the art.

In accordance with the invention, first, second, and third generators are provided, the first and second generators connected in parallel with the absorber to receive a solution in a first flowpath from the absorber, and the third generator connected in series with the second generator to receive solution in a second flowpath from the second generator. As generally embodied in FIG. 1, a first low temperature generator G1, a second intermediate temperature generator G2, and a third high temperature generator G3 are provided. Generators G1 and G2 are connected in parallel with absorber A. Generator G3 is connected in series with generator G2.

As shown in FIG. 1, a first weak solution S1 containing both absorption fluid and refrigerant, preferably a weak LiBr solution, is transferred from absorber A in a first piping flowpath to generators G1 and G2. Preferably, a first solution pump P1 is provided to pump solution S1 to generators G1 and G2, via valves V1 and V2, respectively, in first flowpath FP1. As noted above, generators G1 and G2 are connected in parallel. In other words, the first flowpath FP1 is a parallel flowpath. Consequently, roughly 50% of the volume of S1 is transferred to each respective generator.

As further shown in FIG. 1, a second weak solution S2 is transferred from generator G2 in a second flowpath FP2 to generator G3. Preferably, a second solution pump P2 is provided to pump solution S2 from generator G2 to generator G3. Solution S2 is the same weak LiBr solution that entered generator G2, but now somewhat more concentrated than when it entered G2 as solution S1 for reasons to be described below. As noted above, generator G3 is connected in series with generator G2. In other words, second flowpath FP2 is a series flowpath. Because G3 is connected in series with G2, all of second solution S2 is transferred from G2 to G3.

In accordance with the invention, a heat source is provided for heating the solution in the third generator to a first temperature, thereby separating the solution in the third generator into a refrigerant vapor and an absorption liquid. As embodied in FIG. 1, a heat input is provided to high temperature generator G3.

In the present preferred embodiment, the heat source may be one of two types. The system may be an "indirect-fired" system, which means that a thermal fluid, e.g., a heat transfer fluid, hot water, or steam, may serve as the heat source applied to high temperature generator G3. Alternatively, the system may be a "direct fired" system, using a gas burner or some other type of furnace as the heat source.

Application of the heat input to the solution S2 in generator G3 raises the solution to a first temperature, which preferably is approximately 431° F. At this temperature, refrigerant in the solution S2 is evaporated and driven off in the form of refrigerant vapor. This step leaves behind a third solution S3, which is a concentrated absorption liquid.

In accordance with the invention, a third flowpath is provided for returning the absorption liquid from the third generator to the absorber. As depicted in FIG. 1, a third piping flowpath FP3 directs absorption solution S3 back to absorber A. As embodied in FIG. 1, a third solution pump P3 is provided in third piping flowpath FP3 to assist in returning solution to the absorber. Pump P3 preferably is provided downstream of the heat exchangers, which will be described below.

Preferably, one or more heat exchangers are provided in the solution loops in order to preheat the solution prior to entering the respective generators. This preheating increases the thermal COP of the system.

In FIG. 1, a first heat exchanger HX1 is operatively connected to preheat the solution flowing from the absorber to the first and second generators in the first flowpath. First heat exchanger HX1 is provided in parallel flowpath FP1, receiving weak solution S1 from absorber A, and preheats the solution S1 with hot concentrated solution S3 from third generator G3, combined with a less concentrated solution S4 returning from first generator G1. A portion of the preheated solution S1 (approximately 50% thereof) flows to first generator G1.

Another portion of preheated solution S1 continues in parallel flowpath FP1 to a second heat exchanger HX2. In HX2, the second portion of preheated solution S1 is further preheated by hot concentrated solution S3 from third generator G3. This preheated portion of solution S1 now enters second generator G2.

The second solution S2 departing from second generator G2 in series flowpath FP2 passes through a third heat exchanger HX3, where it is preheated by hot concentrated solution S3 from third generator G3. The preheated solution S2 then enters generator G3.

In accordance with the invention, first, second, and third condensers are operatively connected to receive and condense refrigerant vapor from said first, second and third generators, respectively, the third condenser operatively connected to exchange heat with the second generator, and the second condenser operatively connected to exchange heat with the first generator.

As depicted in FIG. 1, refrigerant vapor V1, having been boiled off in third generator G3, flows into third condenser C3. Although shown schematically as a separate component in FIG. 1, third condenser C3 is physically located so that the hot vapor V1 transfers heat to solution S1 in second generator G2. This heat transfer between third condenser C3 and second generator G2 condensers vapor V1 in condenser C3, while at the same time raising the solution S1 in second generator G2 to a second temperature, which is lower than the first temperature in first generator G1, but still causing some of the refrigerant in solution S1 in second generator G2 to flash into refrigerant vapor V2.

As shown in FIG. 1, the refrigerant condensate from third condenser C3 and the refrigerant vapor V2 from second generator G2 flow to second condenser C2. Although shown schematically as a separate component in FIG. 1, second condenser C2 is physically located so that the hot vapor V2 and high temperature condensate from C3 transfer heat to solution S1 in first generator G1. This heat transfer between second condenser C2 and first generator G1 condenses vapor V2 in second condenser C2, while at the same time raising the solution S1 in first generator G1 to a third temperature, which is lower than the first and second temperatures, but still causing some of the refrigerant in solution S1 in first generator G1 to flash into refrigerant vapor V3.

As shown in FIG. 1, the refrigerant condensate from second condenser C2, and the refrigerant vapor V3 from first generator G1 flow to first condenser C1. Heat is rejected at first condenser C1, thereby condensing all of the refrigerant. The cool liquid refrigerant flows back to evaporator E in order to exchange heat with the refrigeration load, beginning the cycle over again.

The above-described triple-effect absorption system feeds solution from a single absorber to first and second generators in parallel, and solution from the second generator is then fed in series to a third generator. This inverse parallel series solution feeding arrangement provides the following advantages over previous triple effect absorption system arrangements.

The inverse parallel series system has a higher thermal COP and a lower G3 temperature than previous systems. The thermal COP for the invention is 1.736, and G3 temperature is 431° F. These values compare favorably to a parallel system thermal COP of 1.730 and G3 temperature of 439° F., and a series system thermal COP of 1.608 and G3 temperature of 433° F. Lower G3 temperature equates to a longer system life and safer operation. One of the major barriers to the success of previous triple effect absorption systems is corrosion of the system materials, and decomposition of heat mass transfer additives under high G3 temperatures. The lower G3 temperature achievable by the inverse parallel series solution flow helps to correct both problems.

Approximately 50% of solution flow in flowpath FP1 goes to G1. This means that approximately 50% of the solution flows to G2 and subsequently to G3. Thus, the load on HX2 and HX3 is smaller than in a series system, in which all of the solution is passed through HX1, HX2 and HX3. The load on HX2 in the present system also is smaller than in a parallel system (50% in the present system compared to 60–70% in the parallel system). The load on HX3 in the present system is comparable to the HX3 load in the parallel system.

Having only generators G1 and G2 connected in parallel, rather than three generators in parallel as in the parallel system, greatly improves the flow control.

Because the heated solution exiting G2 flows directly to G3, with no additional solution added in, no temperature loss occurs caused by mixing two solutions at different temperatures. This improves thermal efficiency.

All of the solution S2 flowing to generator G3 is initially concentrated in generator G2. In G2, the heat mass transfer additive is boiled off, along with some of the refrigerant. Hence, alcohol separation efficiency of 99% and above is achievable at full load. However, even under a partial load condition, with the reduction of alcohol separation efficiency, G3 temperature is reduced below the alcohol breakdown temperature. Thus, alcohol breakdown is substantially avoided by the present system.

Figure 1A:
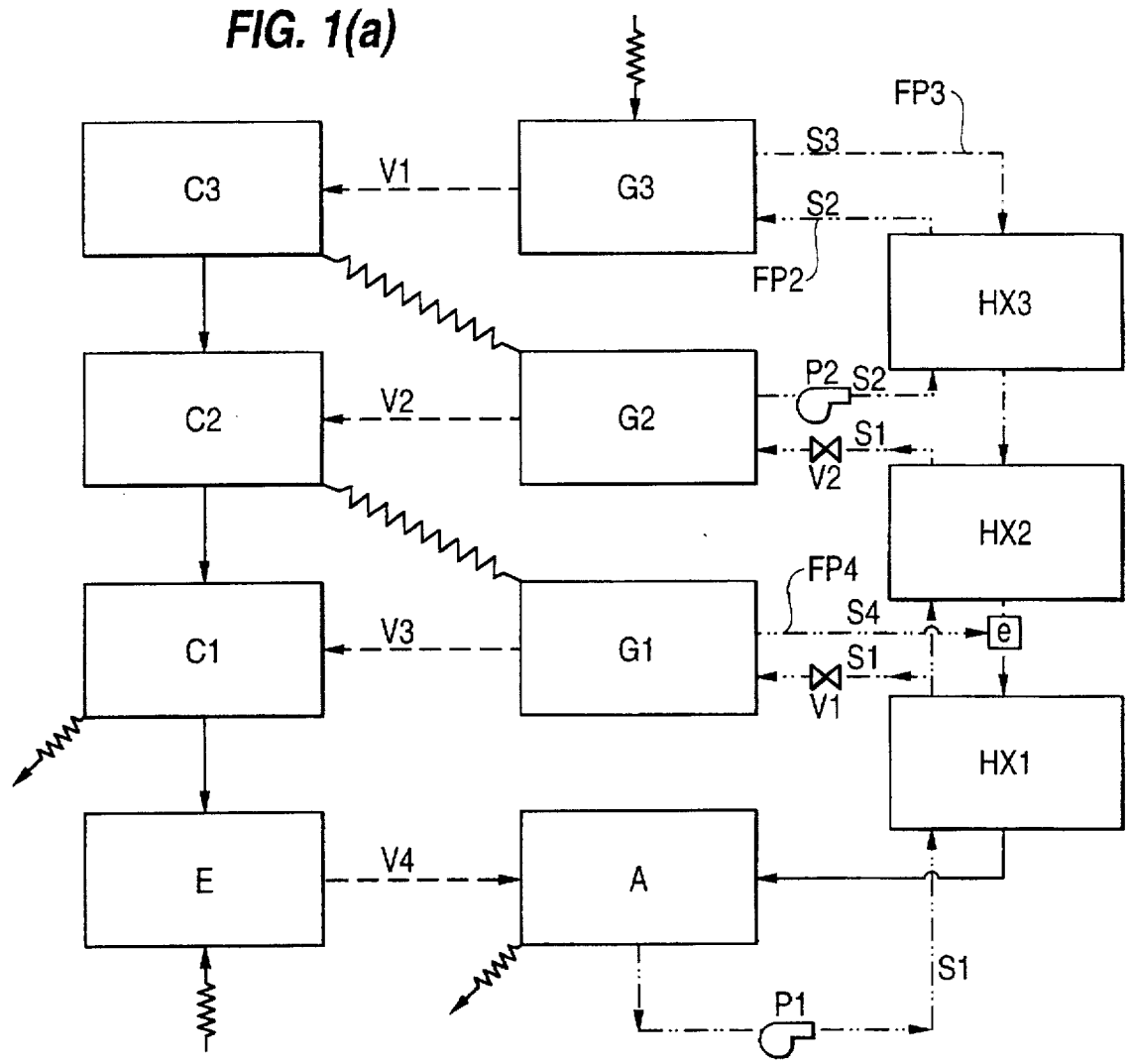
FIG. 1a is a schematic illustrating a modified embodiment of the inverse parallel series triple effect absorption refrigeration system shown in FIG. 1.

An alternative embodiment of the present invention is depicted in FIG. 1(a). In this embodiment, third solution pump P3 in third flowpath FP3 is replaced by an eductor e. Eductor e is provided to assist in the return of solution S4 from generator G1 to absorber A. Eductor e uses the solution flow S3 from generator G3 as the momentum flow to boost pressure of fluid S4 departing from generator G1.

The above description of the preferred embodiment of the invention has been presented for purposes of illustration and description. It is not intended to be exhaustive or to limit the invention to the precise form disclosed. Modifications and variations are possible in light of the above teachings, or may be acquired from practice of the invention. The embodiment was described in order to explain the principles of the invention, and its practical application was described to enable one skilled in the art to utilize the invention in various embodiments and with various modifications as are suited to the particular use contemplated. The scope of the invention is defined by the attached claims, and their equivalents.

I claim:

1. A triple-effect absorption refrigeration system comprising:

an evaporator;

an absorber operatively coupled to said evaporator;

first, second, and third generators, said first and second generators connected in parallel with said absorber to receive a solution in a parallel first flowpath from said absorber, and said third generator connected in series with said second generator to receive the solution in a second flowpath from said second generator;

a heat source for heating the solution in said third generator to a first temperature, thereby separating the solution in said third generator into a refrigerant vapor and an absorption liquid;

a third flowpath for returning the absorption liquid from said third generator to said absorber; and first, second, and third condensers operatively connected to receive and condense refrigerant vapor from said first, second and third generators, respectively, said third condenser operatively connected to exchange heat with said second generator, and said second condenser operatively connected to exchange heat with said first generator.

2. A triple-effect absorption refrigeration system according to claim 1, wherein said heat source comprises a thermal fluid.

3. A triple-effect absorption refrigeration system according to claim 1, wherein said heat source comprises fuel burning device.

4. A triple-effect absorption refrigeration system according to claim 1, further comprising a first heat exchanger operatively connected to preheat the solution flowing from said absorber to said first and second generators in the first flowpath.

5. A triple-effect absorption refrigeration system according to claim 4, wherein said first heat exchanger is configured to preheat the solution flowing from said absorber with the absorption liquid returning from said third generator in the third flowpath.

6. A triple-effect absorption refrigeration system according to claim 4, further comprising a second heat exchanger operatively connected to preheat the solution flowing from said absorber to said second generator in the first flowpath.

7. A triple-effect absorption refrigeration system according to claim 6, wherein said second heat exchanger is configured to preheat the solution flowing from said absorber with the absorption liquid returning from said third generator in the third flowpath.

8. A triple-effect absorption refrigeration system according to claim 4, further comprising a third heat exchanger operatively connected to preheat the solution flowing from said second generator to said third generator in the second flowpath.

9. A triple-effect absorption refrigeration system according to claim 8, wherein said third heat exchanger is configured to preheat the solution flowing from said second generator with the absorption liquid returning from said third generator in the third flowpath.

10. A triple-effect absorption refrigeration system according to claim 1, further comprising a first pump for pumping the solution in the first flowpath from said absorber to said first and second generators.

11. A triple-effect absorption refrigeration system according to claim 10, further comprising a second pump for pumping the solution in the second flowpath from said second generator to said third generator.

12. A triple-effect absorption refrigeration system according to claim 1, wherein the heat exchange between said third condenser and said second generator heats the solution in said second generator to a second temperature lower than the first temperature, thereby removing a portion of refrigerant vapor from the solution in said second generator to be condensed in the second condenser.

13. A triple-effect absorption refrigeration system according to claim 12, wherein the heat exchange between said second condenser and said first generator heats the solution in said first generator to a third temperature lower than the second temperature, thereby removing a portion of refrigerant vapor from the solution in said first generator, to be condensed in said first condenser.

14. A triple-effect absorption refrigeration system according to claim 13, wherein said first generator is further configured with a fourth flowpath for returning to the absorber the solution remaining in the first generator after removal of the portion of refrigerant.

15. A triple-effect absorption refrigeration system according to claim 14, wherein the fourth flowpath is a combined flowpath.

16. A triple-effect absorption refrigeration system according to claim 1, further comprising a pump provided in the third flowpath.

17. A triple-effect absorber refrigeration system according to claim 1, further comprising an eductor provided in the third flowpath.

* * * * *